(12) United States Patent
Rieu et al.

(10) Patent No.: US 11,034,531 B2
(45) Date of Patent: Jun. 15, 2021

(54) PARCEL OR PACKET SORTING/HANDLING SYSTEM COMPRISING A PLATFORM SORTING CONVEYOR LOADED BY A SLAT CONVEYOR HAVING PUSHER SHOES

(71) Applicant: SOLYSTIC, Bagneux (FR)

(72) Inventors: Jean Rieu, Saint Georges les Bains (FR); Wilfrid Beaugrand, Valence (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 16/956,123

(22) PCT Filed: Jan. 22, 2020

(86) PCT No.: PCT/EP2020/051478
§ 371 (c)(1),
(2) Date: Jun. 19, 2020

(87) PCT Pub. No.: WO2020/152205
PCT Pub. Date: Jul. 30, 2020

(65) Prior Publication Data
US 2021/0009364 A1    Jan. 14, 2021

(30) Foreign Application Priority Data

Jan. 24, 2019 (FR) .................................. 1900621

(51) Int. Cl.
*B65G 47/34* (2006.01)
*B65G 47/74* (2006.01)
(Continued)

(52) U.S. Cl.
CPC ........ *B65G 47/844* (2013.01); *B65G 2207/36* (2013.01)

(58) Field of Classification Search
None
See application file for complete search history.

(56) References Cited

U.S. PATENT DOCUMENTS

| 4,709,529 A | 12/1987 | Matsuda et al. |
| 4,732,259 A * | 3/1988 | Yu .................... B65G 47/844 198/368 |

(Continued)

FOREIGN PATENT DOCUMENTS

| FR | 2266647 A | 10/1975 |
| JP | S571115 A | 1/1982 |
| WO | 2016/014196 A1 | 1/2016 |

OTHER PUBLICATIONS

PCT International Search Report and Written Opinion dated Apr. 20, 2020 from corresponding Application No. PCT/EP2020/051478, 14 pages.

(Continued)

*Primary Examiner* — Kavel Singh
(74) *Attorney, Agent, or Firm* — Ware, Fressola, Maguire & Barber LLP

(57) ABSTRACT

A sorting/handling system for sorting/handling parcels or packets (P) comprises a tray conveyor (1) and a loading unit (3) for loading packets onto the trays of the conveyor, which loading unit comprises a plurality of pusher shoes (5) mounted to slide on a slat conveyor and spaced apart in pairs with uniform spacing, said pusher shoes being guided in a rail (8) forming a cam for injecting the packets onto the trays of the tray conveyor.

8 Claims, 1 Drawing Sheet

(51) Int. Cl.
    *B65G 25/08*    (2006.01)
    *B65G 47/84*    (2006.01)

(56) References Cited

U.S. PATENT DOCUMENTS

| | | | | |
|---|---|---|---|---|
| 5,038,912 A * | 8/1991 | Cotter | ................... | B65G 47/844 |
| | | | | 198/370.02 |
| 5,175,976 A * | 1/1993 | Petry | ....................... | B65B 39/14 |
| | | | | 53/252 |
| 5,333,715 A * | 8/1994 | Sapp | .................... | B65G 47/844 |
| | | | | 198/370.02 |
| 5,388,389 A * | 2/1995 | Tisma | .................... | B65G 17/36 |
| | | | | 53/473 |
| 5,666,789 A * | 9/1997 | Ziegler | ................. | B65B 35/405 |
| | | | | 53/447 |
| 5,921,378 A * | 7/1999 | Bonnet | .................. | B65G 17/08 |
| | | | | 198/850 |
| 6,044,956 A * | 4/2000 | Henson | ................ | B65G 47/844 |
| | | | | 198/370.02 |
| 6,702,106 B1 * | 3/2004 | Sweazy | ................... | B07C 3/065 |
| | | | | 198/370.02 |
| 6,786,404 B1 * | 9/2004 | Bonner | ..................... | B07C 3/00 |
| | | | | 235/385 |

OTHER PUBLICATIONS

French Search Report dated Dec. 2, 2019 from corresponding Application No. FR 1900621, 2 pages.

* cited by examiner

PARCEL OR PACKET SORTING/HANDLING SYSTEM COMPRISING A PLATFORM SORTING CONVEYOR LOADED BY A SLAT CONVEYOR HAVING PUSHER SHOES

CROSS REFERENCE TO RELATED APPLICATIONS

This application is the U.S. National Stage of PCT/EP2020/051478 filed on Jan. 22, 2020, which application claims priority under 35 USC § 119 to French Patent Application No. 19 00621 filed on Jan. 24, 2019. Both of these applications are hereby incorporated by reference in their entirety.

TECHNICAL FIELD

The invention relates to the field of facilities for sorting parcels or packets, and more particularly "small import packets".

BACKGROUND OF THE INVENTION

"Small import packets" are considered to be small goods of low value.

They are sorted and delivered within a few days, and so large-scale sorting/handling logistics centers have been designed that are capable of sorting several hundreds of thousands of "small import packets" per day into tens of thousands of different destinations.

"Tray" or "platform" sorting conveyors are already known that are capable of transporting and sorting a very wide variety of packets or parcels. In order to increase the throughput rate of such sorters, it is sought firstly to increase their speed of movement, and secondly to reduce the pitch of the trays or platforms, i.e. to reduce the spacing between them. In a field other than sorting, U.S. Pat. No. 4,709,529 discloses a tray conveyor that serves for wrapping.

A key element of such tray sorting conveyors is the unit for loading the trays, which unit must adapt to accommodate a high speed of movement of the trays along the tray conveying path and a minimum actual width of the tray relative to the maximum dimension of the sorted packets. It is also essential for the loading unit to be able to reject a packet, if necessary, without generating any interruption or disturbance for the remainder of the stream of packets.

SUMMARY OF THE INVENTION

An object of the invention is thus to propose a handling system for handling parcels or packets and more specifically "small import packets" that comprises a tray conveyor with trays spaced apart in pairs at a constant pitch, and a loading unit for loading the packets onto the trays of the conveyors at a rate of one packet per tray, said unit being suitable for enabling the packets to be loaded accurately onto the trays driven at a constant speed with the constraint that a packet can have dimensions close to the dimensions of the tray, and also with the constraint that the spacing pitch between two adjacent trays should be as small as possible in order to increase the overall throughput rate of the tray conveyor, with the further constraint of being able to reject a packet on the fly.

To this end, the invention provides a sorting system for sorting parcels or packets, which sorting system comprises a tray conveyor and a loading unit for loading packets onto the trays of the conveyor at a rate of one packet per tray, said sorting system being characterized in that said loading unit comprises a slat conveyor with slats that extend longitudinally in a direction perpendicular to a loading side of the tray conveyor, in that said loading unit further comprises a plurality of pusher shoes each of which is mounted to slide along a respective slat of the slat conveyor and which are spaced apart in pairs with uniform spacing, in that each pusher shoe is further guided by a rail that forms a cam under the slats of the slat conveyor and that follows a slanting path so that a packet arriving on a first side of the slat conveyor and facing a pusher shoe is pushed transversely on the slat conveyor so that, by moving slantwise, it reaches the loading side of the tray conveyor where it is injected onto a tray of the tray conveyor while said tray is moving, and in that the rail forms a cam comprising two closed guide loops that are interconnected via a switch controlled by a monitoring and control unit, one of the loops following a slanting path and the other loop following a rectilinear path going over the top of a receptacle for receiving reject packets, and the monitoring and control unit being arranged to actuate the switch if it detects that a packet at the inlet of the loading unit cannot be injected onto a free tray of the tray conveyor in such a manner as to direct said packet towards the reject packet receptacle.

The handling system of the invention may have the following features:
- the rail forming a cam is a closed-loop rail;
- the rail has a first portion that is rectilinear and parallel to the longitudinal axis of the slat conveyor, a second portion that extends slantwise, and a third portion that is S-shaped;
- the inclination of the second portion of the rail is approximately in the range 25° to 35°;
- the curvature between the first and second portions of the rail is progressive; and
- the slats of the slat conveyor are spaced apart at a constant pitch that is a sub-multiple of the pitch of the trays of the tray conveyor.

An example of a sorting/handling system of the invention is shown in the drawing.

DESCRIPTION OF THE EMBODIMENTS

Figure 1:
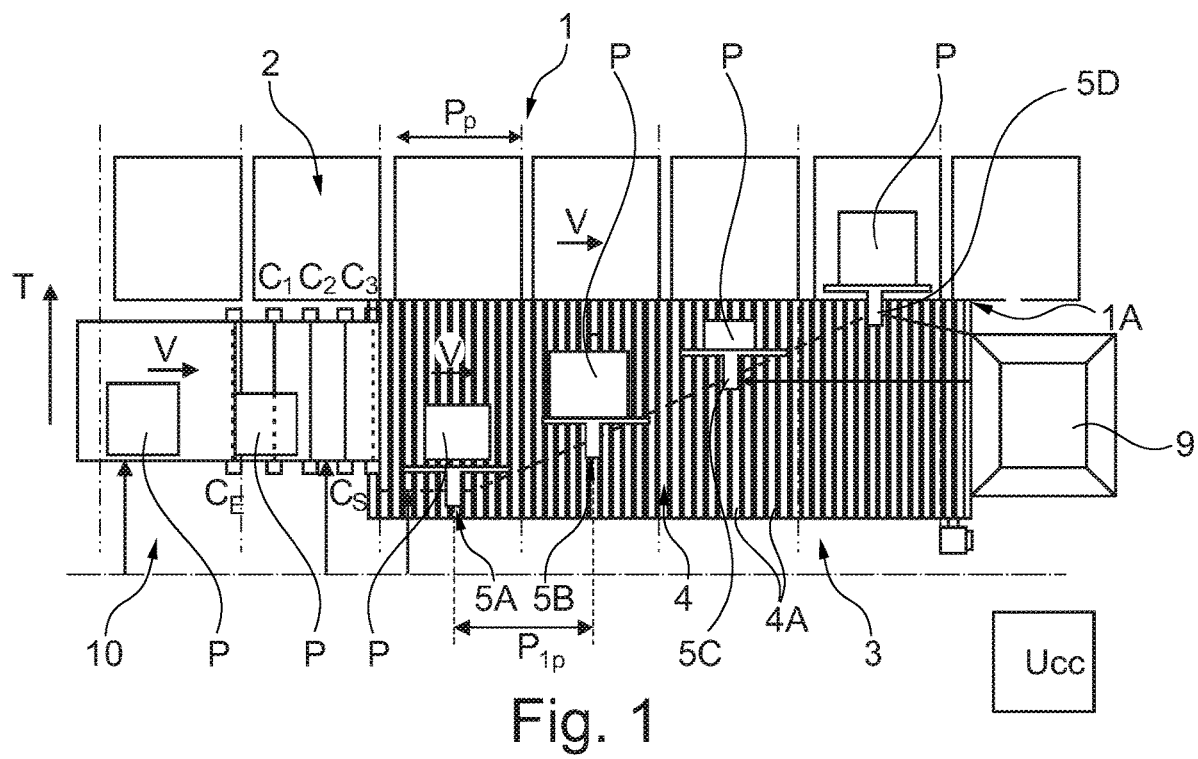
FIG. 1 is a highly diagrammatic plan view of a packet sorting facility with a sorting/handing system of the invention.

FIG. 1 shows a sorting facility for sorting parcels or packets that are, for example, as in this example, "small import packets" P. These packets are to be delivered to their recipients by a logistics operator that may be a postal service.

In this example, the parcel or packet sorting facility includes a packet sorting/handling system of the invention with a horizontal tray sorting conveyor 1 having trays or platforms 2 that, in this example, are spaced apart in pairs at a constant pitch $P_p$, and a loading unit 3 for loading the trays with packets.

The tray conveyor thus operates as a sorter, the sorting outlets not being shown in FIG. 1.

The tray conveyor may use any technology, e.g. it may be a "tilt-tray" or "slide-tray" conveyor, a "cross-belt" conveyor, or a "split-tray" or "bomb-bay" conveyor, or indeed a "push-tray" conveyor.

The trays are arranged to move the packets P in series as flat or as in tilted positions, it being possible for each tray to have the capacity to unload the packet by the tray being raised along one side or along one end.

Figure 2:
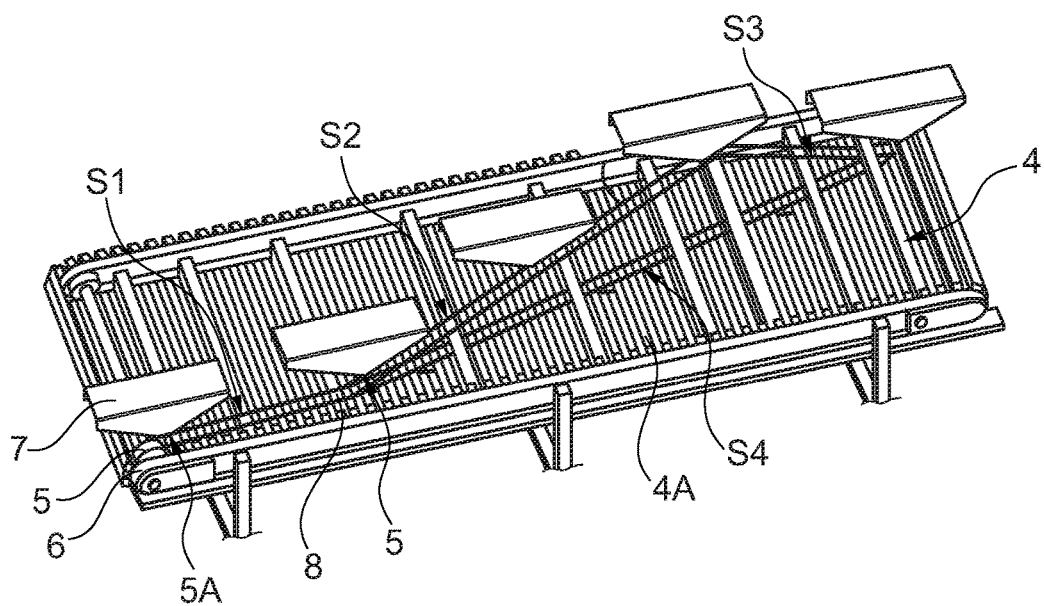
FIG. 2 is a highly diagrammatic perspective view of the loading unit for the sorting/handling system of the invention that is shown in FIG. 1.

In accordance with the invention, the loading unit comprises a slat conveyor 4 on which a plurality of pusher shoes are mounted as shown in FIG. 2.

As shown in FIG. 1, the slats 4A of the conveyor 4 extend longitudinally between two sides of the conveyor 4 in a direction perpendicular to the tray conveyor 1 and more precisely, in this example, in a direction perpendicular to a rectilinear side 1A of the conveyor 1, via which side packets are loaded laterally onto the trays.

The slats 4A that are spaced apart in pairs at constant pitch may be more or less close together or indeed may even overlap in pairs so as to eliminate gaps. The pitch of the slats is a sub-multiple of the pitch of the trays of the tray conveyor. The total length of the slat conveyor is a multiple of the pitch of the tray conveyor.

The conveyors 1 and 4 are closed-loop conveyors.

In accordance with the invention, each of the pusher shoes 5, four of which are indicated by 5A to 5D in FIG. 1, is mounted to slide along a respective slat 4A of the slat conveyor, and said pusher shoes are spaced apart in pairs with uniform spacing over the entire length of the closed-loop path of the conveyor 4, e.g. with a constant pitch $P_{1p}$ identical to the pitch $P_p$ at which the trays of the tray conveyor are separated.

The loading unit in this example and as shown in FIG. 2 has nine pusher shoes, five pusher shoes appearing in FIG. 2 on the top face of the slat conveyor, and four other pusher shoes being disposed under the bottom face of the slat conveyor so that they are not shown in FIG. 2. It is understood that the loading unit may have more than or less than nine pusher shoes without going beyond the ambit of the invention.

In accordance with the invention, each pusher shoe is constituted by a shoe 6 that is, for example, fitted to and mounted to slide along a slat 4A, and that is provided with a pusher blade 7 that is fastened to it and that is of width close to the width of a tray 2, said blade facing the loading rectilinear side 1A of the tray conveyor 1.

When the pitch $P_{1p}$ is wide, the pusher shoe may be split into a plurality of sliding shoes that are separated by one or more slats, in such a manner as to facilitate turning at the ends of the slat conveyor. In which case, only one of the shoes of each pusher is a drive shoe in that it is driven by the rail while the other component shoes of the same pitch engage in interfitting manner with the drive shoe along the straight line segments so as to be driven in parallel, and become disengaged while they are going around the turns.

The top surface of the slat conveyor 4 that can be seen in FIGS. 1 and 2 is slightly higher, along the loading rectilinear side 1A, than the top surfaces of the trays 2, thereby enabling the packets P to slide from the slat conveyor 4 onto the trays 2 of the tray conveyor.

The slats 4A are driven conventionally by two closed-loop chains that mesh with a motor drive unit powered via a variable speed drive.

A monitoring and control unit designated by the reference Ucc in FIG. 1 is provided for synchronizing the longitudinal positions of the pusher shoes such as 5A-5D with the longitudinal positions of the facing trays 2 by monitoring the differences in conveying speed between the conveyors 1 and 4.

In accordance with the invention, each shoe 6 (drive shoe) is also guided as it moves by a rail 8 that forms a cam shown in FIG. 2.

The rail 8 is a closed-loop rail that follows a certain path between the upstream end and the downstream end of the slat conveyor 4 with a return path back towards the upstream end.

For example, each shoe (drive shoe) may be provided with a wheel that engages in the rail 8 through the slatted bed of the conveyor 4 and that acts as a cam follower finger.

The closed-loop rail 8 has a first shoe-guiding segment for injecting the packets P onto the trays 2, which segment extends essentially slantwise between the upstream and downstream ends of the conveyor 4 while becoming closer to the loading side 1A in the direction V, which direction V also shows the direction of movement of the trays 2 and the direction of movement of the shoes 6 on the top of the of the slat conveyor 4.

The rail 8 has a return shoe-guiding segment for guiding the shoes as they go back from the downstream end of the conveyor 4 to the upstream end thereof.

In FIG. 2, the top slats of the conveyor 4 have been removed to show the two segments of the rail 8.

As can be seen in FIG. 2, the segment of the rail 8 that serves to inject the packets onto the trays starts with a small portion of length S1 that extends parallel to and in the vicinity of the free side of the conveyor 4, and then continues with a longer portion of length S2 that moves away from said free side slantwise to reach the vicinity of the other side of the conveyor 4 adjacent to the loading rectilinear side 1A, followed by a small portion of length S3 that is S-shaped, thereby making it possible not only for the blades 7 of the pusher shoes to extend beyond the loading rectilinear side 1A to above a tray 2 of the tray conveyor 1, as shown in FIG. 1 with the pusher shoe 5D, but also for each shoe to be brought back inwards with its blade for its return to the upstream end of the slat conveyor 4 via the portion S4.

The first segment S1 is rectilinear and parallel to the longitudinal axis of the slat conveyor. Its length is at least equal to the pitch $P_{1p}$.

The inclination of the slant of the portion S2 may be approximately in the range 25° to 35°. The curvature of the rail between the segments S1 and S2 is progressive in order to avoid any jolt in transverse acceleration of the packets.

The return segment S4 of the rail that extends from the downstream end to the upstream end of the conveyor 4 also extends slantwise as shown in FIG. 2.

Advantageously, the guide rail 8 may comprise two closed loops connected together via a switch (not shown) controlled by the monitoring and control unit Ucc. One of the two loops is constituted by the portions S1, S2, S3 and S4 of the rail that serve to inject the packets P onto the trays while the other loop (not shown in the figures) follows a closed-loop path that is essentially rectilinear and extends along and very close to the free side of the slat conveyor 4 while going over the top of the receptacle 9 shown in FIG. 1 that serves as a receptacle for receiving reject packets, i.e. packets that cannot be injected onto a tray 2 of the conveyor 1.

As indicated above, FIGS. 1 and 2 show only the elements of the loading unit of the invention that are visible from above the conveyor 4, but it should be understood that said loading unit is like a carousel.

FIG. 1 also shows, upstream from the slat conveyor 4, a magazine 10 for preparing packets P for putting them in line and jogged/referenced along the free side of the slat conveyor 4, while being spaced apart in pairs at a constant pitch equal to $P_p$ and $P_{1p}$ by means of sets of sensors C and of a conveyor made up of a plurality of independent segments that are driven at variable speed and that feed the slat conveyor 4 while also re-centering the packets on their pitch.

In accordance with the invention, the monitoring and control unit Ucc controls the feed magazine 10 to bring the packets one-by-one in series to the inlet of the slat conveyor 4 on the top of which the pusher shoes 5 move slantwise and are spaced apart in pairs at a constant pitch, and, in this example, with the same spacing as the trays 2.

Under the combined effect of the guiding in the rail 8 and of the sliding on a slat 4A, each pusher shoe 5 moves slantwise in the direction V, thereby making it possible, every time, to push a packet P towards the loading rectilinear edge 1A and to inject it onto a free tray 2 of the conveyor 1.

It should be understood that the monitoring and control unit Ucc is arranged to servo-control the speed at which packets are fed to the inlet of the conveyor 4 with the longitudinal speed of said conveyor 4. The monitoring and control unit Ucc also servo-controls the positions of the trays 2 with the positions of the pusher shoes so that, every time, the path of a pusher shoe 5 and the path of a tray 2 to be loaded coincide exactly for injecting a packet pushed by said pusher shoe onto said tray.

As can be understood from FIG. 1, the packets P are injected onto the trays of the conveyor 1 substantially at the downstream end of the slat conveyor 4.

If the monitoring and control unit Ucc detects that the current packet P detected at the inlet of the loading unit cannot be injected onto a free tray of the conveyor 1, it actuates the switch so that the pusher shoe 5 that is present at the downstream end of the slat conveyor and that takes charge of this current packet is guided by the second loop of the rail 8 in such a manner as to direct said packet towards the receptacle 9.

It should be understood that the handling system having a tray conveyor 1 with injectors having pusher shoes 5 may be applied to various types of parcels or packets, including other postal articles.

The invention claimed is:

1. A sorting system for sorting parcels or packets, comprising:
   a tray conveyor with trays moving in a certain direction of movement and
   a loading unit for loading packets onto the trays of the conveyor at a rate of one packet per tray, wherein said loading unit comprises
   a slat conveyor with slats that extend longitudinally in a direction perpendicular to a loading side of the tray conveyor, said slats having a direction of movement parallel to said direction of movement of said trays, and
   said slat conveyor comprising a plurality of pusher shoes each of which is mounted to slide along a respective slat of the slat conveyor and which are spaced apart in pairs with uniform spacing,
   wherein each pusher shoe is further guided by a rail that forms a cam under the slats of the slat conveyor and that follows a slanting path so that a packet arriving on a first side of the slat conveyor and facing a pusher shoe is pushed transversely on the slat conveyor so that, by moving slantwise, it reaches the loading side of the tray conveyor where it is injected onto a tray of the tray conveyor while said tray is moving, and
   wherein the rail forms a cam comprising two closed guide loops that are interconnected via a switch controlled by a monitoring and control unit, one of the loops following a slanting path and the other loop following a rectilinear path going over the top of a receptacle for receiving reject packets, and
   wherein the monitoring and control unit is configured to actuate the switch if it detects that a packet at an inlet of the loading unit cannot be injected onto a free tray of the tray conveyor in such a manner as to direct said packet towards the reject packet receptacle.

2. The system according claim 1, wherein the rail forming a cam is a closed-loop rail.

3. The system according to claim 1, wherein the rail has a first portion that is rectilinear and parallel to the longitudinal axis of the slat conveyor, a second portion that extends slantwise, and a third portion that is S-shaped.

4. The system according to claim 3, wherein the inclination of the second portion of the rail is approximately in the range 25° to 35°.

5. The system according to claim 3, wherein the curvature between the first and second portions of the rail is progressive.

6. The system according to claim 3, wherein the slats of the slat conveyor are spaced apart at a constant pitch that is a sub-multiple of the pitch of the trays of the tray conveyor.

7. The system according to claim 2, wherein the slats of the slat conveyor are spaced apart at a constant pitch that is a sub-multiple of the pitch of the trays of the tray conveyor.

8. The system according to claim 1, wherein the slats of the slat conveyor are spaced apart at a constant pitch that is a sub-multiple of the pitch of the trays of the tray conveyor.

* * * * *